(12) United States Patent
Xu et al.

(10) Patent No.: US 6,439,266 B1
(45) Date of Patent: Aug. 27, 2002

(54) PRESSURE PULSATION DAMPING VALVE

(75) Inventors: Mindi Xu, Naperville; Shei-Kai Chang, Darien, both of IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 09/845,348

(22) Filed: May 1, 2001

(51) Int. Cl.[7] ................................................ F16L 55/04

(52) U.S. Cl. ........................... 138/31; 138/30; 138/26; 220/721

(58) Field of Search .................... 138/31, 30; 137/593; 220/720, 721

(56) References Cited

U.S. PATENT DOCUMENTS

| | | | |
|---|---|---|---|
| 4,556,087 A | 12/1985 | Casilli | 138/30 |
| 5,133,647 A | 7/1992 | Herron et al. | 417/312 |
| 5,797,430 A | 8/1998 | Beckë et al. | 138/30 |
| 5,868,168 A | 2/1999 | Mott et al. | 138/31 |
| 5,904,181 A | 5/1999 | Tooma et al. | 138/30 |

*Primary Examiner*—Patrick Brinson
(74) *Attorney, Agent, or Firm*—Linda K. Russell

(57) ABSTRACT

A system for damping pressure pulses is provided, including a channel for permitting fluid flow between a first chamber and a second chamber, a piston for varying a fluid flowing space such that pressure pulses in fluid are damped, and a flexible wall for absorbing pressure pulses in fluid, wherein the flexible wall is connected to the piston by a transmitting rod such that a movement of the piston results in a deformation of the flexible wall and vice versa.

38 Claims, 7 Drawing Sheets

PRESSURE PULSATION DAMPING VALVE

BACKGROUND OF THE INVENTION

1. Field of the Invention

This invention relates to a damping valve for hydraulic pressure pulses produced by a positive displacement pump in dispensing fluid, especially in dispensing liquid chemicals for semiconductor industry.

2. Background Information

In many practical fields, fluid is transported and delivered from one location to another with a positive displacement pump. Pressure pulses within the fluid produced by the pumps induce various problems for the fluid and transport system. For example, when semiconductor manufacturers dispense ultra-pure corrosive chemicals with a dual diaphragm pump from chemical containers to user stations, pressure pulses produced by the diaphragm pump will induce particulate impurity shedding from the components of the dispensing system. When fuel is supplied to combustion chambers (e.g., in vehicles) with an electric reciprocating fuel pump, the fluid flow (and therefore the combustion) is not stable because of the pressure pulsation created by the pump. Such non-stable flow or the pressure pulses also produce undesirable noise.

A common practice for eliminating pulsation problems is to install a pressure pulse damper right after the pump. Numerous pulsation-damping devices are found in the prior art, and the effectiveness of a pulsation damper is limited either by its construction or by its functioning principles. With the dampers described in U.S. Pat. Nos. 5,797,430, 5,868,168, and 5,904,181, all of which are hereby incorporated by reference in their entirety, a flexible wall is used to absorb fluid pulses by deforming it upon subjection to fluid pulsation. This flexible wall can be a diaphragm, a membrane, or a bellows, which moves back and forth between a chamber with compressible air or gas and a chamber with fluid to absorb the pressure pulses. Since a pressure pulse propagates along the flowing direction of fluid while it is deforming the flexible wall, it will not be effectively absorbed and damped, and therefore the problems related to pressure pulsation in fluid remain. Also, this type of damping device is operable only within a limited operation pressure range in which they are originally designed or adjusted. The pressure of fluid and a pulse beyond the limit will result in excessive deformation of the flexible wall and therefore failure of the damping function.

For preventing a flexible wall from excessive deformation or failure, a compressible gas chamber with adjustable gas pressure has been proposed in U.S. Pat. No. 4,556,087, hereby incorporated by reference in its entirety. Upon pressure change of fluid in which pressure pulses exist, high-pressure gas or air is allowed to flow in or out of the compressible gas chamber to adjust the pressure against the fluid pressure at the other side of the flexible wall. However, pressure pulses may not be effectively damped because of the propagation of pressure along the flowing direction of fluid. Another drawback is that the construction of this damping device is complicated. Another damping device is based on a counter flow concept, as described in U.S. Pat. No. 5,133,647, hereby incorporated by reference in its entirety. The fluid with pressure pulses is divided into two flows at opposite directions, based on a concept that the pulses cancel out when these two flows merge together. Since the fluid may not be compressible and the propagation of pressure pulses is along the fluid flowing direction, a pulse could be segregated into two or more pulses and, in many cases, the damping device may not function at all when the two separated flows are mismatched.

As it has been realized, those pressure dampers that can be found in the prior art do not meet users' needs for a highly effective and reliable pressure pulse damper.

SUMMARY OF THE INVENTION

Accordingly, the present invention is directed to providing a pressure pulsation-damping valve that effectively damps pressure pulses in fluids by avoiding the disadvantages of the devices as described in the prior art.

According to an exemplary embodiment of the present invention, a system for damping pressure pulses is provided, including a channel for permitting fluid flow between a first chamber and a second chamber, a piston for varying a fluid flowing space such that pressure pulses in fluid are damped, and a flexible wall for absorbing pressure pulses in fluid, wherein the flexible wall is connected to the piston by a transmitting rod such that a movement of the piston results in a deformation of the flexible wall and vice versa.

According to another embodiment of the present invention, a method for damping pressure pulses in a fluid is provided, including the steps of permitting fluid flow between a first chamber and a second chamber, varying the fluid flow such that pressure pulses in the fluid are damped, and absorbing pressure pulses in the fluid, wherein the steps of varying and absorbing are performed substantially at the same time.

To achieve the objects of the present invention, a fluid pressure pulsation-damping valve that can be installed in a fluid dispensing line is provided with the features of damping pulses in fluid by both a movable wall and a movable piston type of part. The whole damping valve consists of housing with a cylinder shape, a movable wall, a transmitting rod, a damping piston, and necessary connection parts. The housing is partitioned into three chambers by a movable wall and a solid separation wall with a nozzle. Two of the chambers provide the channels for fluid flowing through, and the other one is either filled with compressible air or gas, or installed with a supporting spring inside to allow the movable wall to move back and forth into this chamber.

The movable wall and the damping piston are conjugated with the transmitting rod and mounted inside the housing. The transmitting rod is arranged to pass through the nozzle to form an annular channel for fluid, and fixed on the movable wall at one end and on the damping piston at another end. The movable wall is fixed on the housing as a partition wall for the compressible air chamber and one of the fluid chambers. The movable damping piston is located in the fluid chamber that is formed by the non-movable wall of the housing with a nozzle and another end of the housing. Two openings on the housing wall at separated locations allow the communication of fluid between outside fluid conduits and the damping valve. The damping valve starts to function upon a pressure pulse either applied to the movable piston or the movable wall, and the transmitting rod ensures concurrent movement of the two movable parts. The movable wall absorbs the pressure pulse by its outward movement to the compressible air chamber, and the movable piston damps the pressure pulses by restricting the fluid flow when it passes through an annular channel of changed size. Therefore, the two movable parts effectively damp pressure pulses.

Besides being highly effective, the present invention also has the advantages of being easy to use, easy to manufacture, easy to maintain, and cost effective because of its simple construction. The operation of the present pressure-damping valve is also highly reliable because of its very limited number of parts and straightforward layout.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

Figure 1:
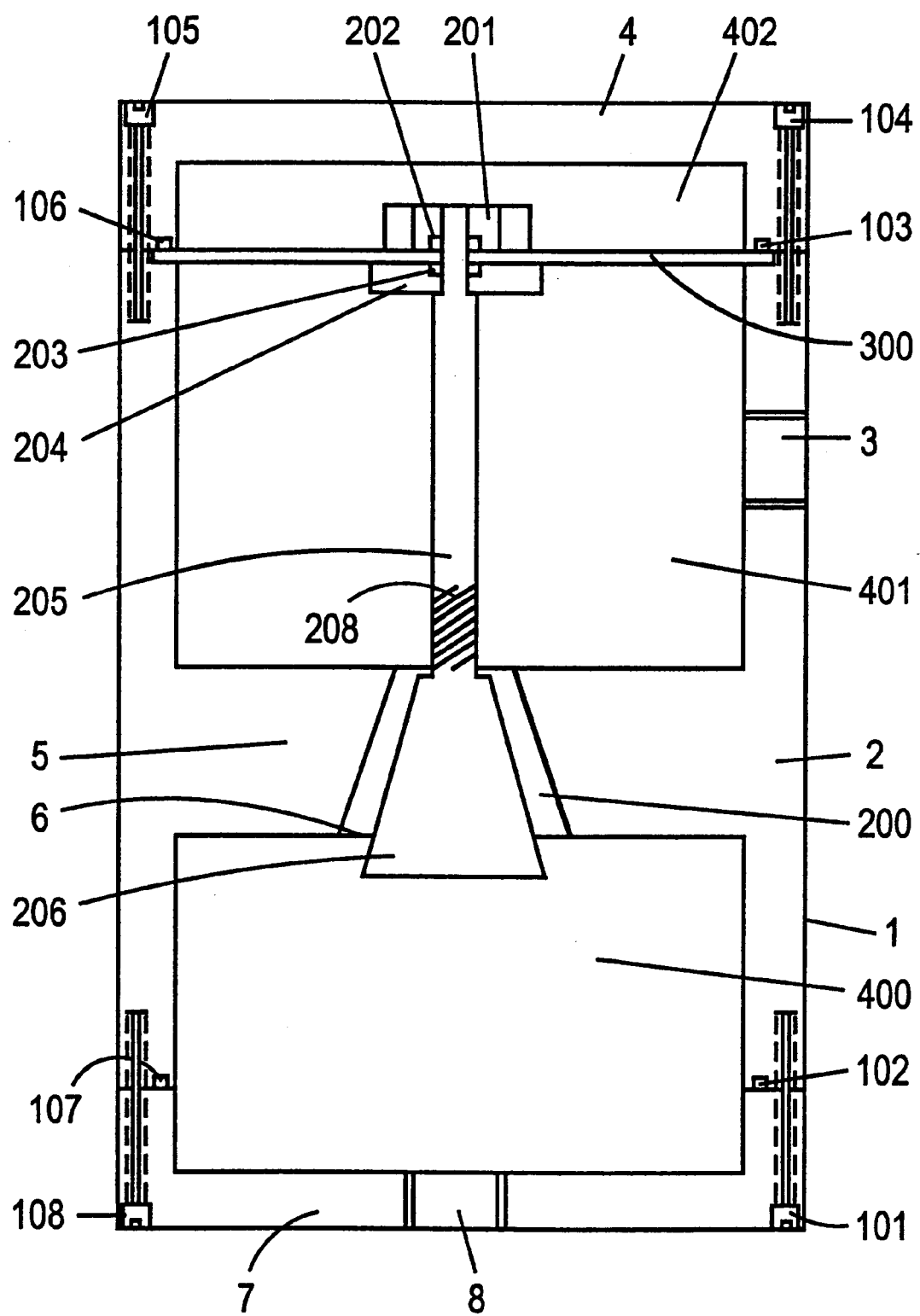
FIG. 1 illustrates an exemplary embodiment of the present invention with a diaphragm and a damping piston of a cone frustum.

Referring to FIG. 1, a damping valve for damping pressure pulses in a fluid includes housing 1, damping piston 206, transmitting rod 205, and diaphragm or flexible wall 300. First chamber 401, second chamber 400, channel or throat nozzle 6, piston 206, and flexible wall 300 are all positioned within housing 1. Housing 1 can be of a cylindrical or any other shape, and includes main body 2, first or top cap 4, and second or bottom cap 7. Main body 2 includes first opening 3 at its upper side wall to allow fluid to flow either in or out of the damping valve.

There are two cavity spaces inside main body 2 that are formed by the inner walls of main body 2 and separation wall 5. The top cavity space becomes first chamber 401 for receiving fluid while flexible wall 300 is fixed on the top. Second chamber 400 is formed also to receive fluid when the bottom cavity space is capped with cap 7. First chamber 401 includes first opening 3 and second chamber 400 includes second opening 8, where each of first and second openings 3 and 8 permit at least one of fluid flow into and out of housing 1. Separation wall 5 can have flat surfaces on both sides or can alternatively be funnel shaped. Throat nozzle 6 is made at the center of separation wall 5 to permit fluid flow between first chamber 401 and second chamber 400. Throat nozzle 6 can be cylindrical, a cone frustum shape, or any other shape, depending on the shape of damping piston 206.

The top cap 4 is fixed on main body 2 with sink head screws 104 and 105, preferably a total of at least 6 screws uniformly distributed along the periphery of its top surface. Flexible wall 300 is sandwiched between cap 4 and main body 2. Flexible wall 300 could extend to outside surface of the housing but preferably to have a diameter smaller than the housing diameter. A deep platform can form along the inner periphery of main body 2 to accommodate flexible wall 300 at its edge. Flexible wall 300 can be an overall circular shape, or any other configuration (e.g., concave, convex, or flat surface). An o-ring 103 and 106 is placed along the edge of the diaphragm or flexible wall 300 to ensure that cap 4 and main body 2 are securely fixed together and airtight.

Bottom cap 7 is fixed on main body 2 in a same method as for top cap 4. However, there is not any flexible wall but an o-ring 102 and 107 placed between the surfaces of bottom cap 7 and main body 2 to make the connection airtight. Bottom cap 7 can have second opening 8 to allow fluid with pressure pulses to flow into the camping valve or fluid after damping pressure pulses to flow out of the damping valve. Opening 8 can alternatively be made on the lower sidewall of main body 2 for fluid to flow out or into chamber 400. Openings 3 and 8 can, for example, be threaded or built with Flaretek fittings to allow easy connections with fluid flowing conduits. For example, first and second openings 3 and 8 can be connected to fluid flowing conduits attached to a dual diaphragm pump or a chemical container.

A damping piston 206 is provided for varying a fluid flow by changing an annular or fluid flowing space 200 in throat nozzle 6 such that pressure pulses in fluid are damped. As illustrated, damping piston 206 with the shape of a cone frustum sits freely inside throat 6 on separation wall 5. Piston 206 can have the similar shape as throat 6 but with a smaller diameter; however, its height can be either the same or larger. Annular space 200 is formed between throat opening 6 and piston 206, and can have a cross section area smaller or equal to the cross-area of opening 8 or 3 when damping piston 206 is at its balanced position.

Flexible wall 300 is provided for absorbing pressure pulses in fluid, and is connected to piston 206 by transmitting rod 205 such that a movement of piston 206 results in a deformation of flexible wall 300 and vice versa. Rod 205 can be manufactured together with piston 206 (e.g., from a single piece of material), or can be attached (e.g., by thread 208) with piston 206 together at a first end, and attached at a second end on flexible wall 300 (a diaphragm as in FIG. 1) with, for example, support disk 204 and screw nut 201. Support disk 204 is positioned on the shoulder of rod 205, which is formed by cutting a portion of rod 205 in its radial direction. Small o-ring 203 is fitted at the center of disk 204 to prevent fluid leakage. This end of rod 205 penetrates through flexible wall 300 at its center to another side of flexible wall 300. A similar small o-ring 202 is placed around rod 205 before rod 205 is connected to flexible wall 300 with threaded nut 201.

Material for main body 2 and caps 4 and 7 can be selected based on fluid to be handled, and must be compatible with the fluid and capable of withstanding high pressure. Materials such as metals and alloys (such as stainless steel), plastics (such as polypropylene and Teflon), and glass can be used for main body 2 and caps 4 and 7, although usable materials are not limited to these examples. Transmitting rod 205 and damping piston 206 can, for example, be manufactured from light materials such as plastics, glass, and alloys, or any other formable material. Flexible wall 300 can, for example, be a plastic diaphragm or a thin membrane. The materials for support disk 204 and screw nut 201 can be plastic, alloy, or any other lightweight material. O-rings can be any conventional or other materials compatible with fluid to be handled.

With the embodiment shown in FIG. 1, the fluid with pressure pulses can opt to flow (e.g., by way of fluid flowing conduits) through opening 8 into the damping valve and out from opening 3, or in the opposite direction. If the fluid flows into the damping valve through opening 8, it will fill up chamber 400 first. The volume of chamber 400 depends on the throat size and the diameter of main body 2. It can, for example, be from as small as a few milliliters to as large as a few liters, or any other size. Also, chambers 400 and 401 can be of different or substantially equal volumes. The fluid with pressure pulses applies pressure on the bottom surface of damping piston 206. Because of the pressure difference across piston 206, the damping piston 206 is pushed to move towards flexible wall 300 direction. Flexible wall 300 will change its shape and move into third chamber 402 (also referred to as an air chamber) under the applied pulsation force through transmitting rod 205 and circular disk 204. This movement results in a reduction of annular space 200. Pressure restriction is, therefore, increased when the fluid flows through the reduced annular space 200, and the pressure pulses within the fluid is then damped. The fluid flows through annular throat 200 into fluid chamber 401. Any remaining pulses with reduced pressure strength after damping by the changeable annular space 200 push further flexible wall 300 to move into air chamber 402. This movement will depend on the pressure of the remaining pulses. In this way, a fluid flowing space is varied and pressure pulses are absorbed at substantially the same time. Hence, pressure pulses are doubly damped and completely smoothed out.

The fluid after damping the pressure pulses flows out chamber 401 through opening 3 and back to an outside fluid conduit. The volume of chamber 401 can, for example, be equal to or larger than the volume of chamber 400. A larger volume can permit a reasonable resident time for the fluid. After a pressure pulsation, flexible wall 300 moves back to its balanced position by its recovery force. This backward movement of flexible wall 300 also brings damping piston 206 back to its balanced position through transmitting rod 205.

When the fluid with pressure pulses is allowed to flow into the damping valve through opening 3, the fluid will first fill up chamber 401. Fluid pressure will apply on flexible wall 300 at the side contacting with fluid. Therefore, flexible wall 300 will move with transmitting rod 205 and damping piston 206 towards air chamber 402 when it is subjected to a pressure pulse. Flexible wall 300 absorbs pressure pulses at a first extent and, due to the movement of damping piston 206, annular space 200 that allows fluid to flow out of chamber 401 is reduced in size. Propagation of pressure pulses along the fluid flowing direction is further damped by the reduced annular space 200. The fluid then flows into chamber 400 and out of the damping valve through opening 8 to an outside fluid conduit.

Figure 2:
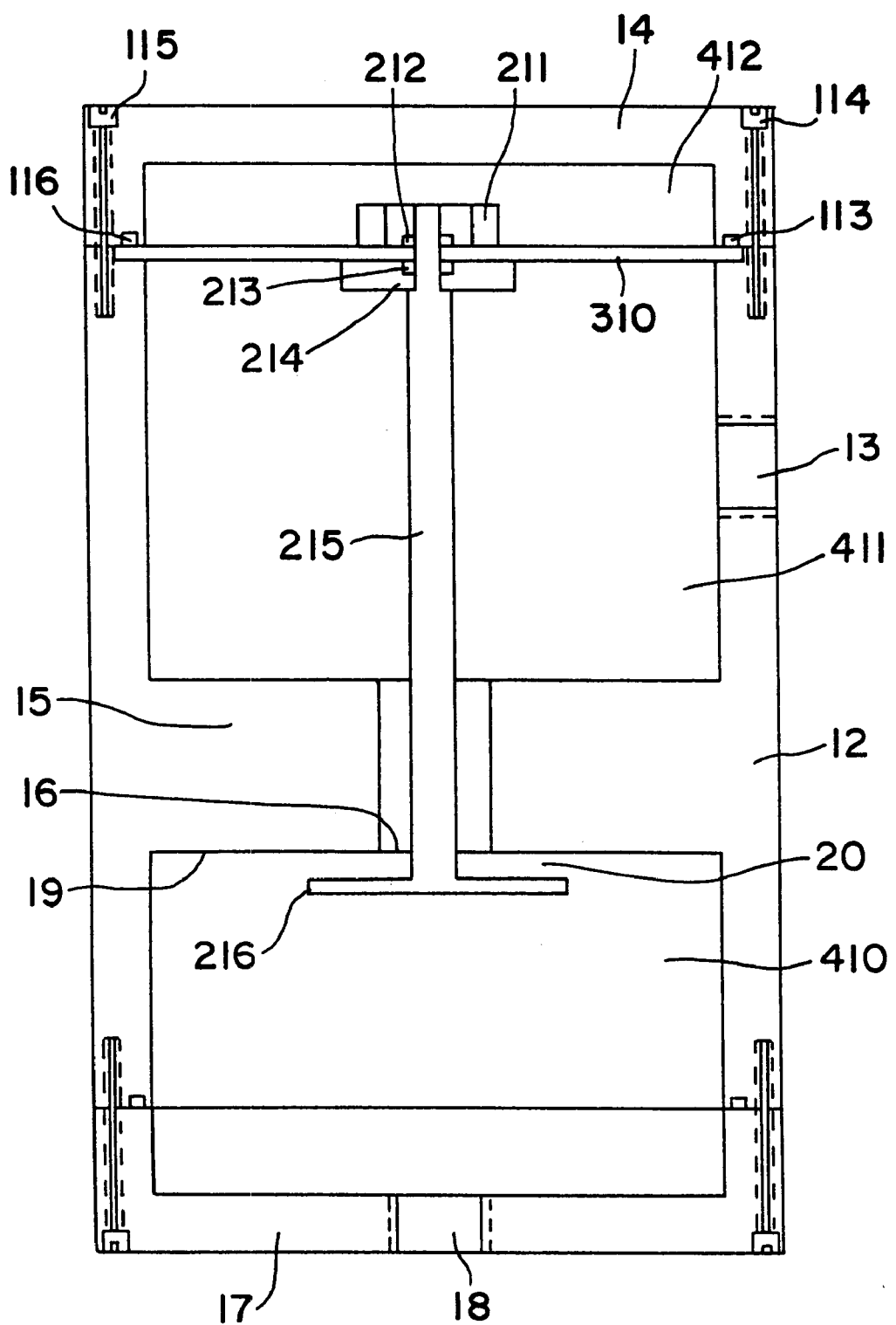
FIG. 2 illustrates another embodiment of the present invention with a diaphragm and a damping piston of a disc shape.

The damping piston 206 as in FIG. 1 can be made into a circular disc or cylinder shape, or any other shape. One embodiment is shown in FIG. 2. As seen, damping disc piston 216 can be located outside throat nozzle 16 and inside chamber 410. Disc 216 can have a diameter larger or equal to the throat diameter. Disc 216 can be manufactured together with transmitting rod 215 or can be a separate part to be connected (e.g., threaded) on one end of transmitting rod 215. Disc 216 and throat nozzle 16 and bottom surface 19 of a portion of separation wall 15 form channel 20 for fluid to pass through. The height of channel 20 or the distance between disc 216 and wall surface 19 depends on the disc diameter, which can, for example, have a value to form a circular opening along the edge of disc 216 with the area equal to or smaller than the cross area of opening 18. Throat 16 can be of a circular, cylindrical, cone frustum, or any other shape with the size to accommodate transmitting rod 215 while leaving enough space for fluid passing through.

Similar to the embodiment shown in FIG. 1, fluid can opt to flow into the damping valve through either opening 18 or opening 13 and out either 13 or 18. When fluid with pressure pulse flows into the damping valve through opening 18, pressure pulses will apply force to damping disc 216. Disc 216 and transmitting rod are pushed towards flexible wall 310 by virtue of this force, and, therefore, space 20 is reduced to have higher restriction to the fluid. This reduced channel 20 damps pressure pulses by restricting the fluid flow. Similar to the embodiment shown in FIG. 1, the movement of flexible wall 310 will further damp pressure pulses.

Figure 3:
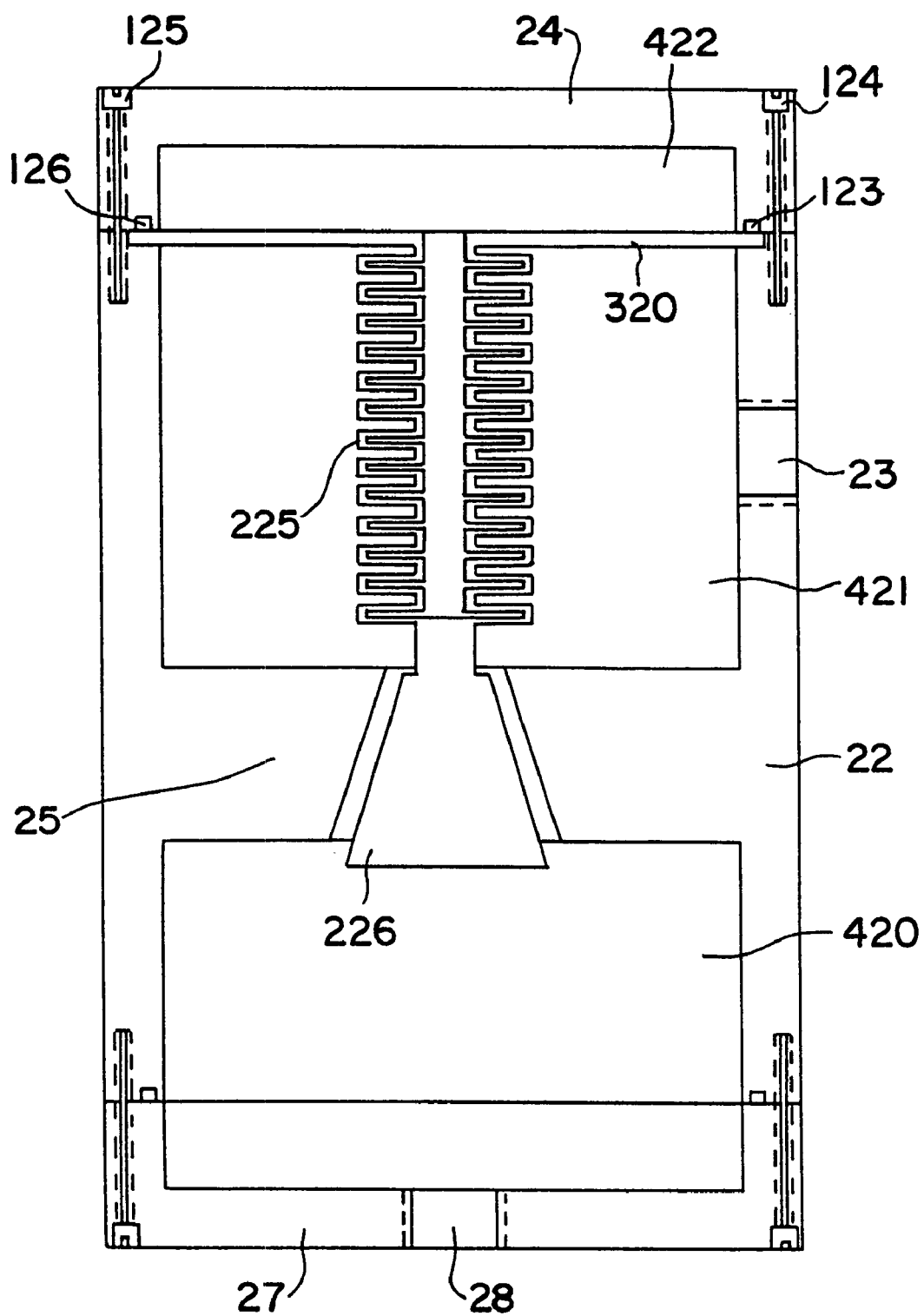
FIG. 3 illustrates a further embodiment of the present invention with a bellows as a movable wall.

Another embodiment is shown in FIG. 3. Instead of a flexible wall, bellows 225 is used to absorb pressure pulse and adjust for the movement of damping piston 226. With this embodiment, non-flexible wall 320 replaces flexible walls 300 and 310 shown respectively in the embodiments of FIG. 1 and FIG. 2. This non-flexible wall 320 is mainly used to support bellow 225 and damping piston 226. Of course, it can alternatively be flexible wall like those in the previous embodiments. Support wall 320 is fixed with cap 24 as for flexible wall 300 on main body 22. Fixing the blows on cap 24 at the inner surface can eliminate support wall 320. When operated, fluid can flow into the damping valve through opening 28 and to make a movement of damping piston 226 by pressure pulses towards the direction of support wall 320.

The air chambers 402, 412, and 422 in the embodiments shown in FIGS. 1–3 can be filled, for example, with compressed dry air or high pressure gas (e.g., an inert gas or a combination of inert gases). The air pressure can range, for example, from 0 psig to about 60 psig, depending on the operation condition of the pressure damping valves. Referring to FIG. 1 as an example, a higher pressure inside air chamber 402 will reduce the moving distance of flexible wall 300, and hence, the moving distance of pressure damping piston 206. A high air pressure in air chamber 402 is desirable when the damping valve is used for the fluid with high pressure. The distance between the top of fastening nut (201 in FIG. 1 and 211 in FIG. 2) and the inside flat wall of cap (cap 4 in FIG. 1 and cap 14 in FIG. 2) allows a maximum forward movement of flexible wall 300 or 310. This distance is generally determined with the maximum space available for damping piston 206 or 216 before it reaches the throat surface in separation wall (wall 5 in FIG. 1, wall 15 in FIG. 2, and wall 25 in FIG. 3). The distance between the top of fastening nut 201 or 211 and the inside flat wall of cap 4 or 14 can, for example, be equal to or smaller than the maximum moving space of damping piston.

Figure 4:
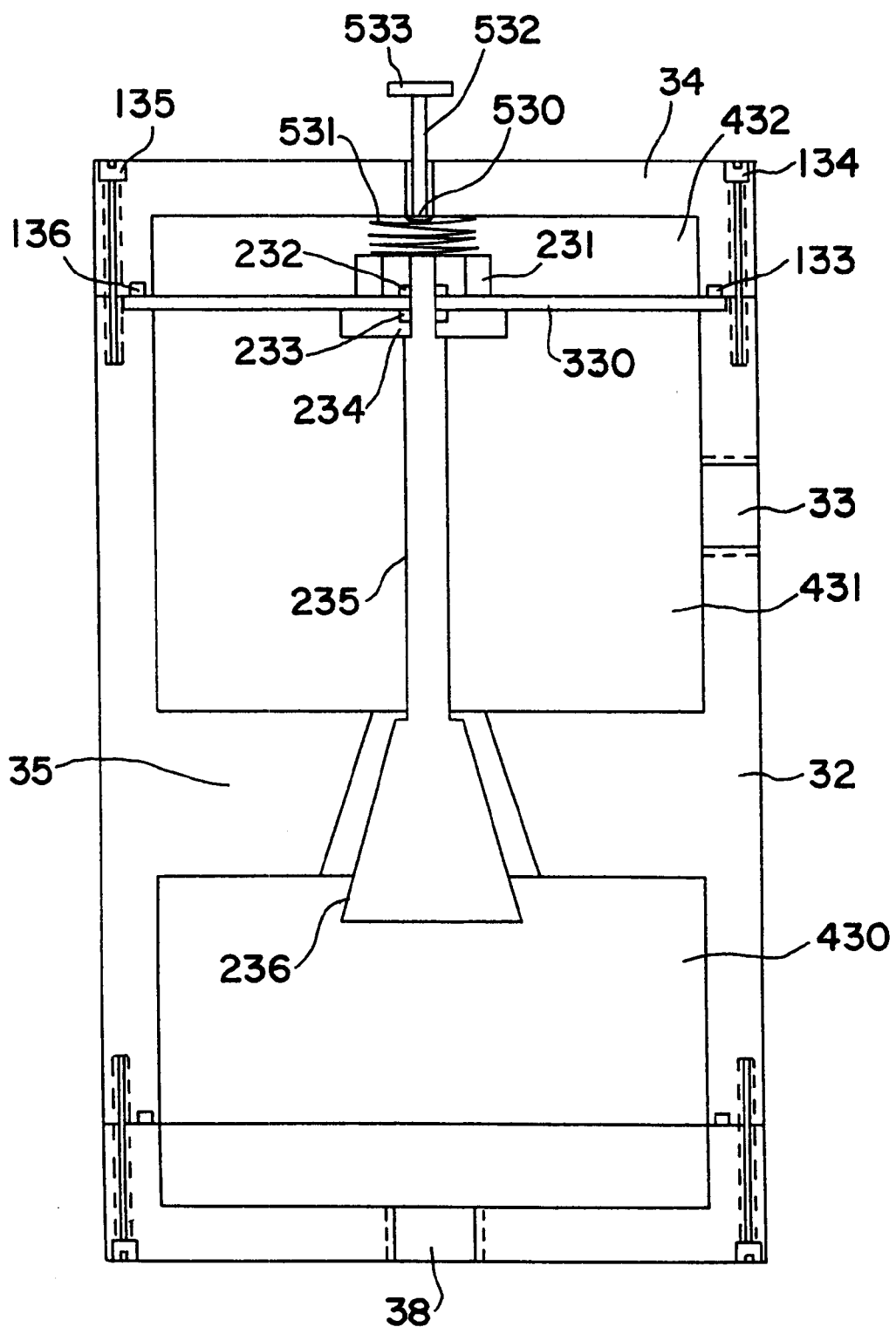
FIG. 4 illustrates a further embodiment of the present invention with a spring support for a diaphragm.

A spring can be used to support the flexible wall at the side of air chamber, and an assembly incorporating such a feature is shown in FIG. 4. Turning rod 532 with hand wheel 533 at one end (e.g., as for a valve) can be extended through cap 34 and contact with the top of spring 531 at another end. Accordingly, the top end of spring 531 can be fixed on a flat surface of small stub 530 or a disc slightly larger than the cross section area of turning rod 532. With turning wheel 533, the compression pressure of spring 531 to flexible wall 330 can be adjusted anytime based on an operating condition. Alternatively, turning rod 532 and turning wheel 533 are not used, and cap 34 does not include a hole through which turning 532 can extend. In this case, one end of spring 531 is fixed on the inside wall of top cap 34 with small stub 530 or by another fastening means (e.g., solder), and the other end is fixed on fastening nut 231 by any conventional or other means.

Figure 5:
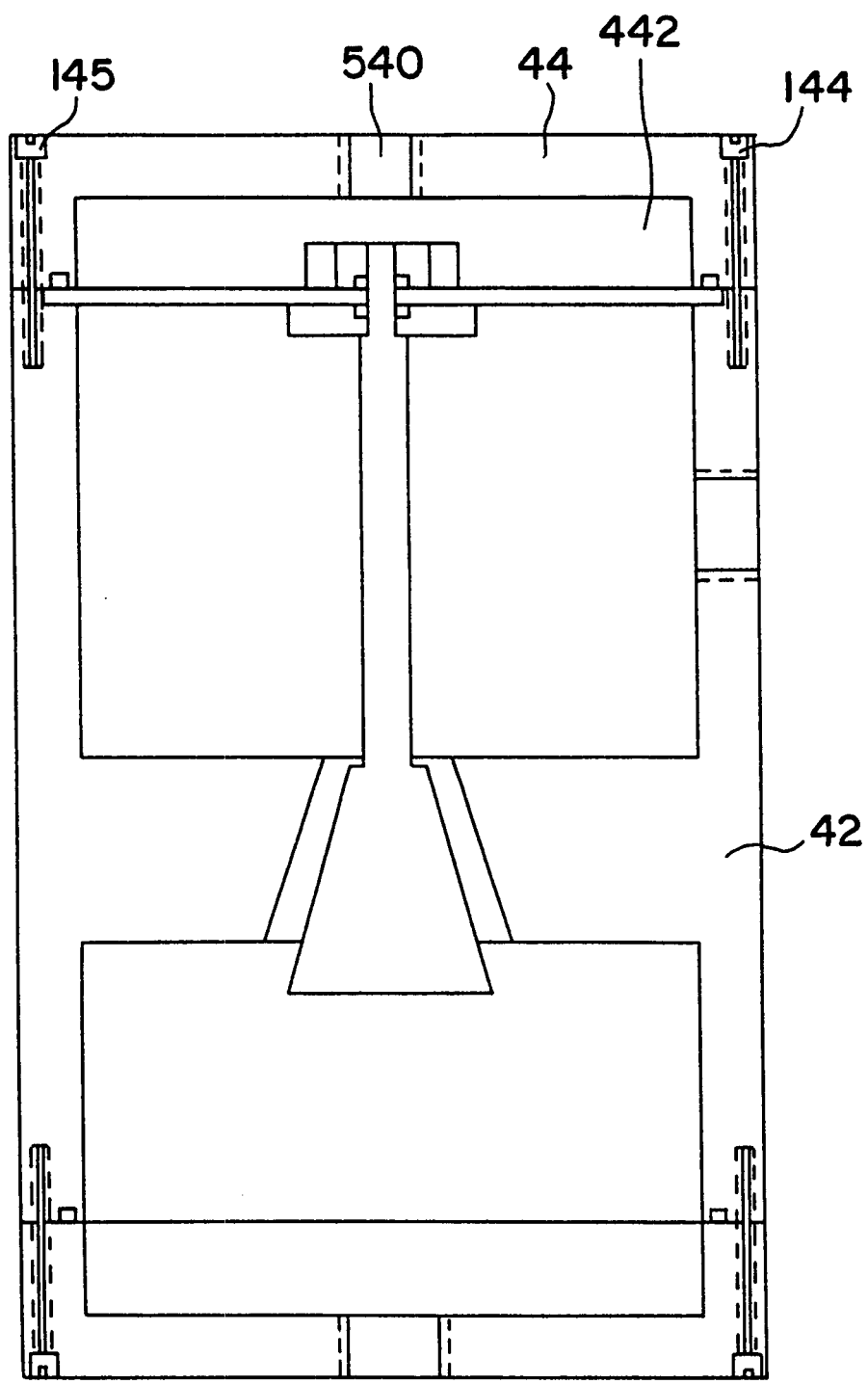
FIG. 5 illustrates a further embodiment of the present invention with a connection to high-pressure air or gas.

A third opening 540 can be made on cap 44 as shown in FIG. 5. This opening 540 allows the communication of air chamber 442 with a compressed dry air or high pressure gas source through, for example, an air conduit with a flow adjusting valve and a pressure gauge. The pressure inside air chamber 442 can be adjusted by adjusting the air or gas pressure.

Figure 6:
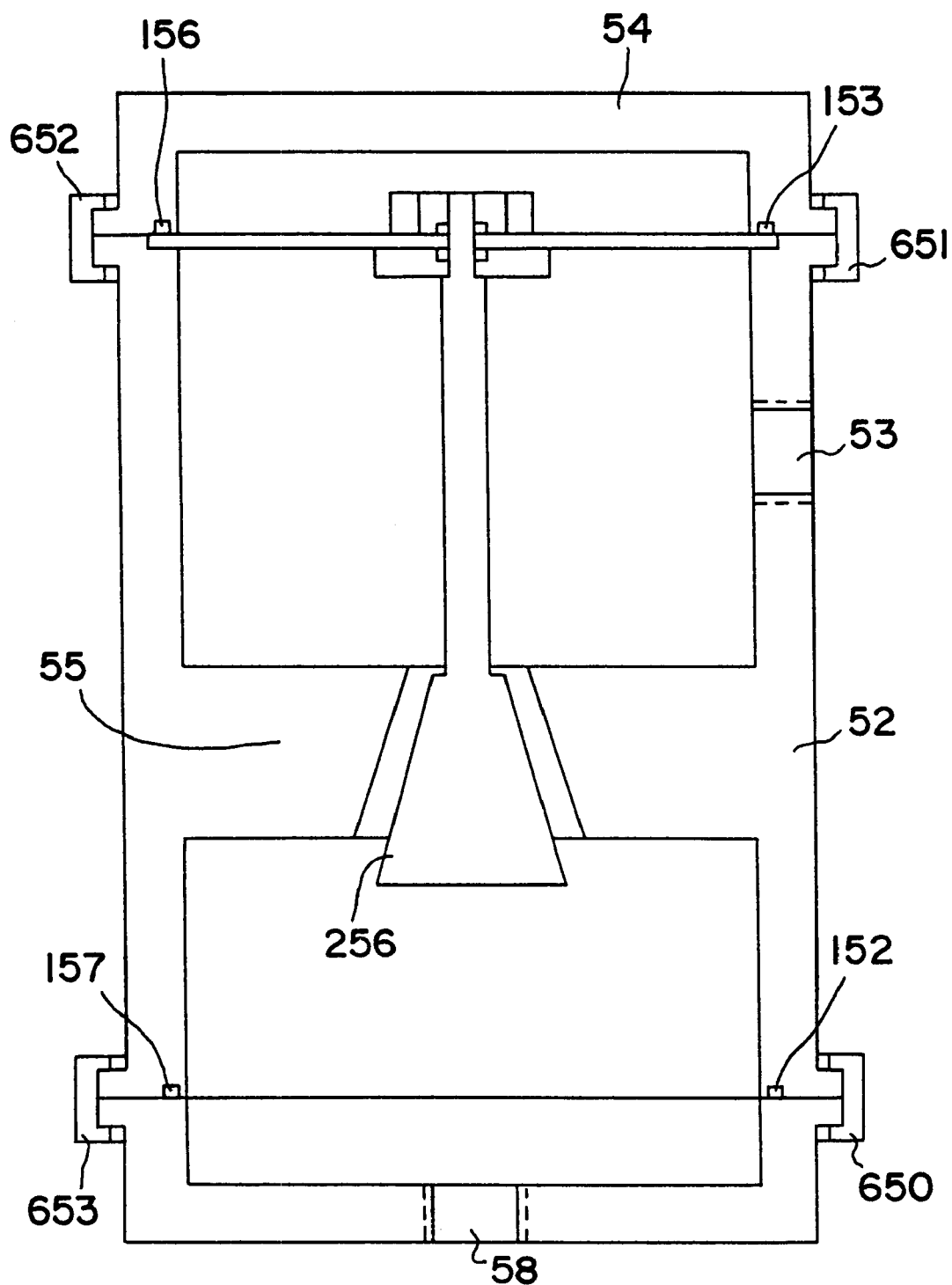
FIG. 6 illustrates a further embodiment of the present invention with a different assembly.

The main body (body 2 in FIG. 1, body 12 in FIG. 2, and body 22 in FIG. 3) and caps (caps 4 and 7 in FIG. 1, caps 14 and 17 in FIG. 2, and caps 24 and 27 in FIG. 3) as shown in FIGS. 1–3 can, in one embodiment, be assembled together by means of clamping ring 651 and 652 as shown in FIG. 6. Clamping rings 651 and 652 can be a split type (or any other type of fastening means) that can be easily widened for installation and removal. Accordingly, caps 4, 14, and 24 and respective main bodies 2, 12, and 22 can be made to have flanges at the ends for connections.

Figure 7:
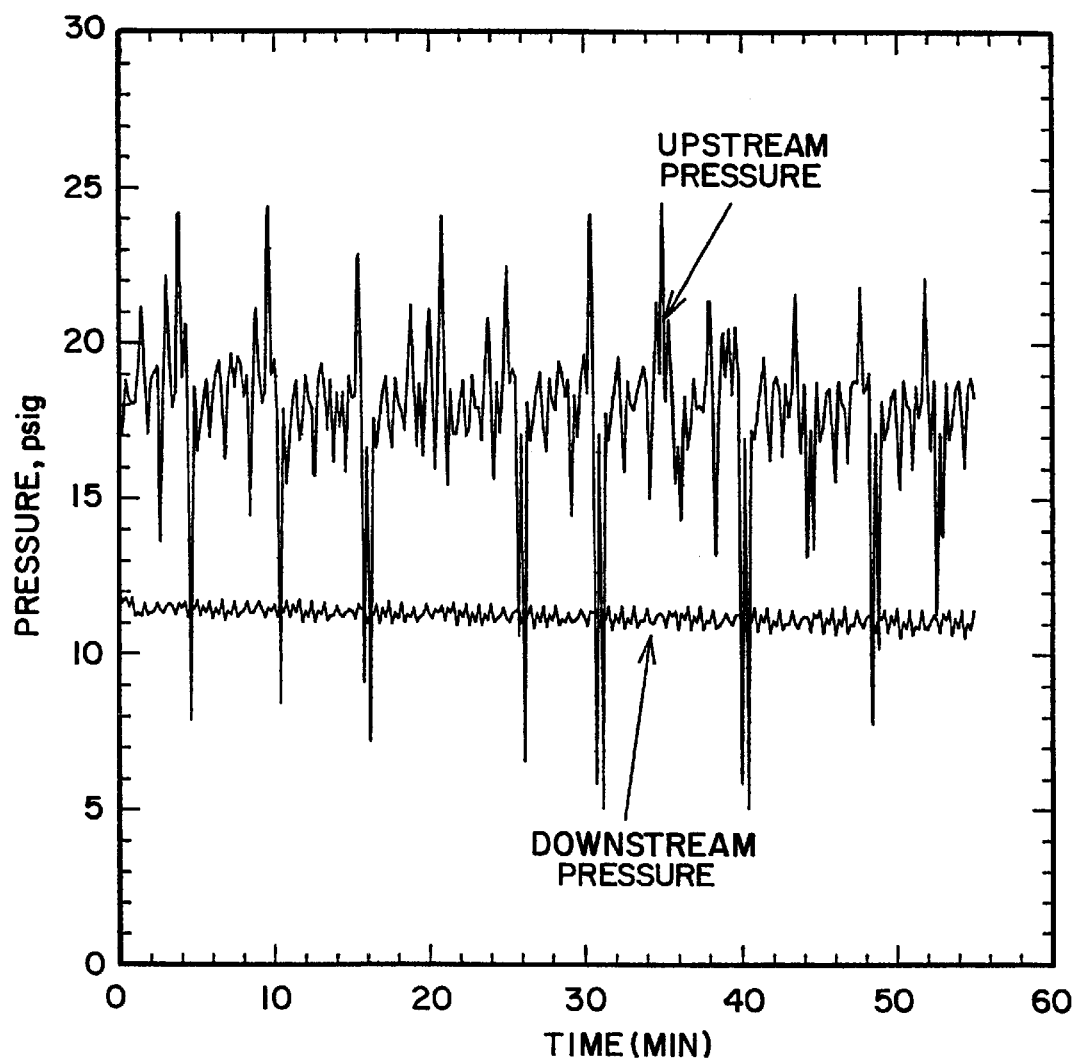
FIG. 7 shows test results with an embodiment of the present invention.

The embodiment shown in FIG. 1 was built and tested for damping pressure pulses within deionized water delivered with a pneumatic dual diaphragm pump. The damping valve was built with a cylinder shape with its overall height of 6 inches and diameter of 3 inches. The flexible wall was a Teflon diaphragm of a concave shape. The damping valve was installed in the fluid conduit right after the pump. Fluid flowed into the damping valve through opening 3 as in FIG. 1. Pressure in the fluid was measured before and after the damping valve. FIG. 7 shows the test results. As can be seen, the fluid had several pressure pulses before entering the damping valve, and had no pulses downstream from the damping valve.

In this way, the present invention provides a pressure pulsation damping valve consisting of two fluid chambers and an air chamber damps pressure pulses within fluid by means of a damping piston and a flexible wall inside the chambers. Fluid with pulses triggers the joint movement of the flexible wall and the damping piston to absorb pressure pulses and restrict the pulse flow. The damping valve of the present invention has a simple construction and configuration and its function is not limited by the orientation of installation in a fluid conduit.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A system for damping pressure pulses, comprising:
   a channel for permitting fluid flow between a first chamber and a second chamber;
   a piston for varying a fluid flowing space such that pressure pulses in fluid are damped, wherein the piston varies the fluid flowing space by changing an annular space; and
   a flexible wall for absorbing pressure pulses in fluid, wherein the flexible wall is connected to the piston by a transmitting rod such that a movement of the piston results in a deformation of the flexible wall and vice versa.

2. The system of claim 1, wherein the channel is a throat nozzle.

3. The system of claim 1, wherein the first and second chambers, the channel, the piston, and the flexible wall are positioned within a housing.

4. The system of claim 3, wherein the first chamber includes a first opening and the second chamber includes a second opening, each of the first and second openings permitting at least one of fluid flow into and out of the housing.

5. The system of claim 3, wherein the channel is positioned in a separation wall that separates the first chamber from the second chamber.

6. The system of claim 5, wherein the first chamber is positioned between the flexible wall and the separation wall, and wherein the second chamber is positioned between the separation wall and a second cap.

7. The system of claim 1, comprising:
   a third chamber positioned between the flexible wall and a first cap.

8. The system of claim 7, wherein the third chamber contains at least one of compressed dry air and high pressure gas.

9. The system of claim 8, wherein the third chamber includes a third opening for permitting communication of the third chamber with at least one of an air source and a gas source.

10. The system of claim 7, wherein the flexible wall is supported by a spring positioned in the third chamber.

11. The system of claim 10, comprising:
    an adjustment rod and hand wheel for adjusting a compression force applied to the flexible wall by the spring.

12. The system of claim 1, wherein the transmitting rod and the piston are manufactured from a single piece of material.

13. The system of claim 1, wherein the transmitting rod and the piston are connected by threads.

14. The system of claim 1, wherein the piston is one of conical, a frustum cone shape, a disc shape, and cylindrical.

15. The system of claim 1, wherein the channel is one of conical, a frustum cone shape, and cylindrical.

16. The system of claim 1, wherein the flexible wall is one of a diaphragm and a bellows.

17. A method for damping pressure pulses in a fluid with a pressure pulse damping system, comprising the steps of:
    using a throat nozzle for permitting fluid flow between a first chamber and a second chamber;
    using a piston for varying a fluid flowing space such that pressure pulses in fluid are damped, wherein the piston varies the fluid flowing space by changing an annular space; and
    using a flexible wall for absorbing pressure pulses in fluid, wherein the flexible wall is connected to the piston by a transmitting rod such that a movement of the piston results in a deformation of the flexible wall and vice versa.

18. The method of claim 17, wherein the first and second chambers, the throat nozzle, the piston, and the flexible wall are positioned within a housing.

19. The method of claim 18, wherein the first chamber includes a first opening and the second chamber includes a second opening, each of the first and second openings permitting at least one of fluid flow into and out of the housing.

20. The method of claim 19, wherein each of the first opening and the second opening is connected to a fluid flowing conduit.

21. The method of claim 17, comprising the step of:
    using a third chamber positioned between the flexible wall and a first cap.

22. The method of claim 21, wherein the third chamber contains at least one of compressed dry air and high pressure gas.

23. The method of claim 22, wherein the third chamber includes a third opening for permitting communication of the third chamber with at least one of an air source and a gas source.

24. The method of claim 23, wherein the third opening is connected with a conduit to at least one of an air source and a gas source.

25. A method for assembling a pressure pulse damping system, comprising the steps of:

installing in a housing a throat nozzle for permitting fluid flow between a first chamber and a second chamber;

installing in the housing a piston for varying a fluid flowing space such that pressure in fluid is damped, wherein the piston varies the fluid flowing space by changing an annular space; and installing in the housing a flexible wall for absorbing pressure pulses in fluid, wherein the flexible wall is connected to the piston by a transmitting rod such that a movement of the piston results in a deformation of the flexible wall and vice versa.

26. The method of claim 25, wherein the housing is one of cylindrical, conical, and frustum shape.

27. The method of claim 25, wherein the throat nozzle is positioned in a separation wall that separates the first chamber from the second chamber.

28. The method of claim 27, wherein the first chamber is positioned between the flexible wall and the separation wall, and wherein the second chamber is positioned between the separation wall and a second cap.

29. The method of claim 25, comprising the step of:

installing in the housing a third chamber positioned between the flexible wall and a first cap.

30. The method of claim 29, wherein the third chamber contains at least one of compressed dry air and high pressure gas.

31. The method of claim 30, wherein the third chamber includes a third opening for permitting communication of the third chamber with at least one of an air source and a gas source.

32. The method of claim 29, wherein the flexible wall is supported by a spring positioned in the third chamber.

33. The method of claim 32, comprising the step of:

installing to the housing an adjustment rod and a hand wheel for adjusting compression force applied to the flexible wall by the spring.

34. The method of claim 25, comprising the step of: manufactured from a single piece of material.

35. The method of claim 25, wherein the transmitting rod and the piston are connected by threads.

36. The method of claim 25, wherein the piston is one of conical, a frustum cone shape, a disc shape, and a cylindrical shape.

37. The method of claim 25, wherein the throat nozzle is one of conical, a frustum cone shape, and cylindrical.

38. The method of claim 25, wherein the flexible wall is one of a diaphragm and a bellows.

* * * * *

UNITED STATES PATENT AND TRADEMARK OFFICE
CERTIFICATE OF CORRECTION

PATENT NO. : 6,439,266 B1  
DATED : August 27, 2002  
INVENTOR(S) : Mindi Xu and Shei-Kai Chang It is certified that error appears in the above-identified patent and that said Letters Patent is hereby corrected as shown below:

<u>Column 10,</u>
Lines 17-18, please delete both lines after "claim 25," and insert -- wherein the transmitting rod and the piston are manufactured from a single piece of material. --

Signed and Sealed this

Third Day of December, 2002

JAMES E. ROGAN
*Director of the United States Patent and Trademark Office*